US 6,749,784 B2

(12) United States Patent
Blanchon

(10) Patent No.: US 6,749,784 B2
(45) Date of Patent: Jun. 15, 2004

(54) METHOD OF MANUFACTURING A PART OUT OF REINFORCED PLASTICS MATERIAL

(75) Inventor: Charles-Guillaume Blanchon, Oyonnax (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/811,617

(22) Filed: Mar. 20, 2001

(65) Prior Publication Data

US 2001/0045684 A1 Nov. 29, 2001

(30) Foreign Application Priority Data

Mar. 20, 2000 (FR) .............................. 00 03530

(51) Int. Cl.⁷ .............................................. B29C 43/20
(52) U.S. Cl. ..................... 264/163; 264/255; 264/266; 425/292; 425/356; 425/412; 425/469; 425/519
(58) Field of Search ................................. 264/163, 266, 264/247, 255, 259, 267; 425/112, 292, 515, 518, 519, 356, 346, 352, 412, 469

(56) References Cited

U.S. PATENT DOCUMENTS

| 2,484,656 A | | 10/1949 | Sikka et al. | |
| 3,115,678 A | * | 12/1963 | Keen et al. ................. | 425/356 |
| 3,337,664 A | * | 8/1967 | Lyon ......................... | 264/547 |
| 4,328,067 A | * | 5/1982 | Cesano ...................... | 425/292 |
| 4,545,105 A | * | 10/1985 | Kowalsky ................. | 29/469.5 |
| 4,909,721 A | * | 3/1990 | Warburton ................. | 425/292 |
| 4,961,700 A | | 10/1990 | Dunbar | |
| 5,032,106 A | * | 7/1991 | Warburton ................. | 425/292 |
| 5,040,962 A | * | 8/1991 | Waszeciak et al. ......... | 425/292 |
| 5,085,571 A | * | 2/1992 | Congleton ................. | 425/292 |
| 5,114,651 A | * | 5/1992 | Warburton ................. | 425/292 |
| 5,154,872 A | * | 10/1992 | Masui et al. ............... | 264/266 |
| 5,188,787 A | * | 2/1993 | King et al. ................. | 425/292 |
| 5,800,759 A | * | 9/1998 | Yamazaki et al. .......... | 425/292 |
| 6,159,402 A | * | 12/2000 | Valyi ......................... | 264/266 |
| 6,328,549 B1 | * | 12/2001 | Valyi et al. ................ | 425/112 |

FOREIGN PATENT DOCUMENTS

| AU | 532 845 B | | 10/1983 | |
| EP | 0 416 216 A2 | | 3/1991 | |
| JP | 01141719 A | * | 6/1989 | ........... B29C/51/10 |
| JP | 05154868 A | * | 6/1993 | ........... B29C/45/14 |

* cited by examiner

Primary Examiner—Mark Eashoo
(74) Attorney, Agent, or Firm—Oliff & Berridge, PLC

(57) ABSTRACT

The invention provides a method of manufacturing a reinforced plastics material part from a drapable sheet (6) by means of a mold (1) comprising a first portion (2) and a second portion (3) that are movable relative to each other. The method comprises the following steps:

placing the sheet on the first portion (2) of the open mold;

pressing the sheet (6) against said first portion (2) at one or more locations by means of one or more pushers (8) mounted on the second portion (3) of the mold and movable relative to said second portion;

closing the mold (1) and compacting the sheet (6); and trimming the portion of the sheet that projects from the join plane (15) after the mold (1) has been closed, and unmolding the part.

33 Claims, 3 Drawing Sheets

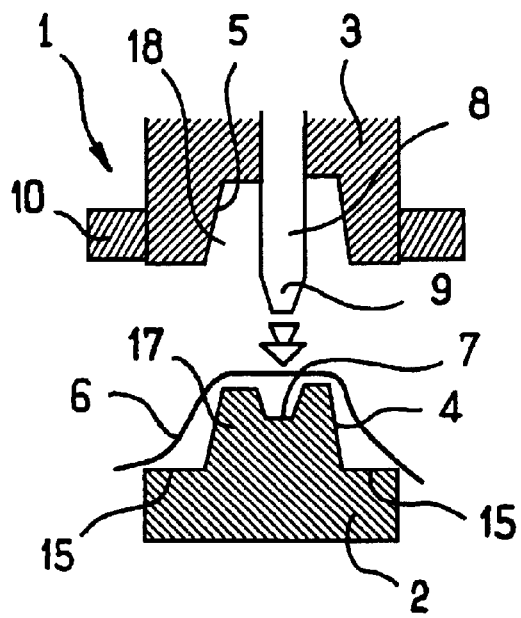
FIG_1
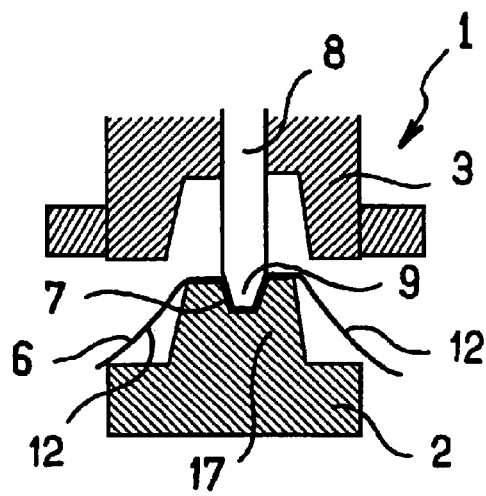
FIG_2
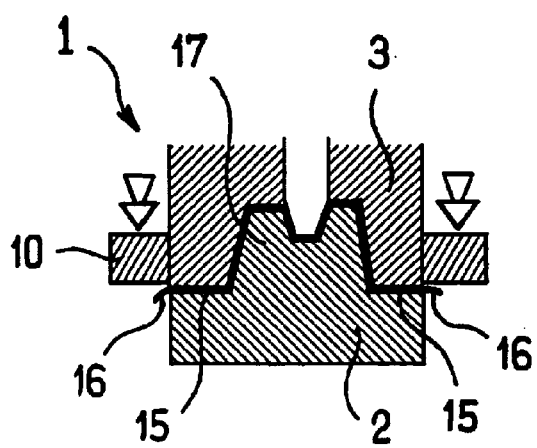
FIG_3
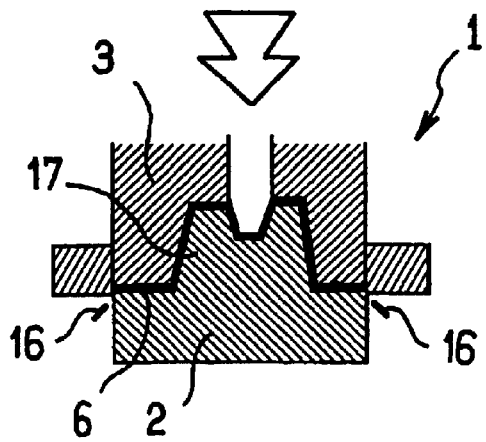
FIG_4

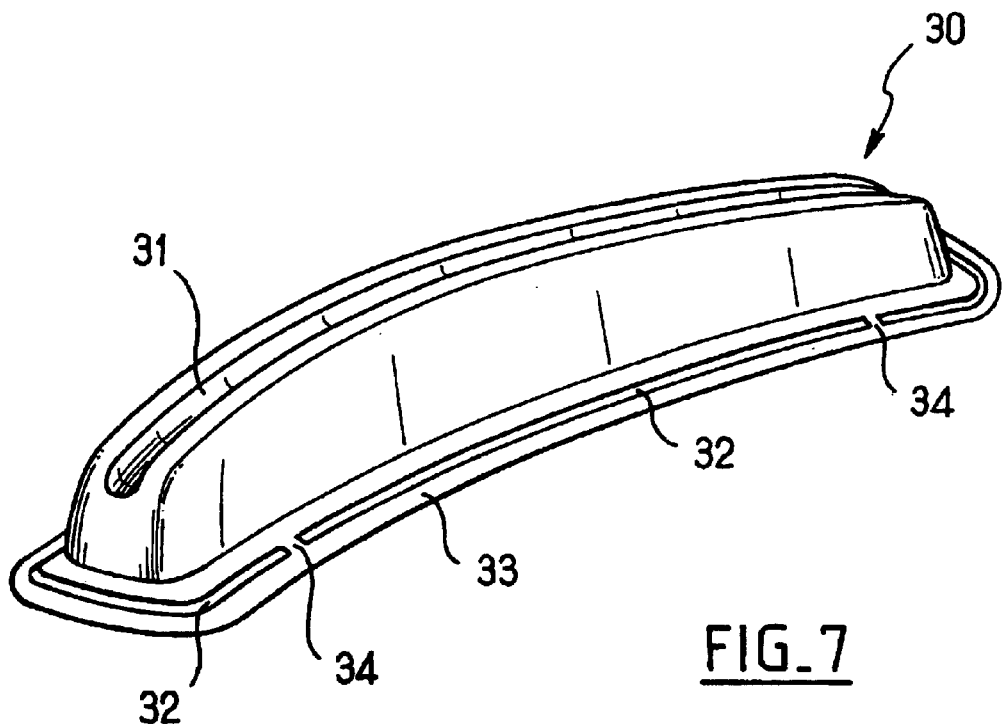
FIG_7
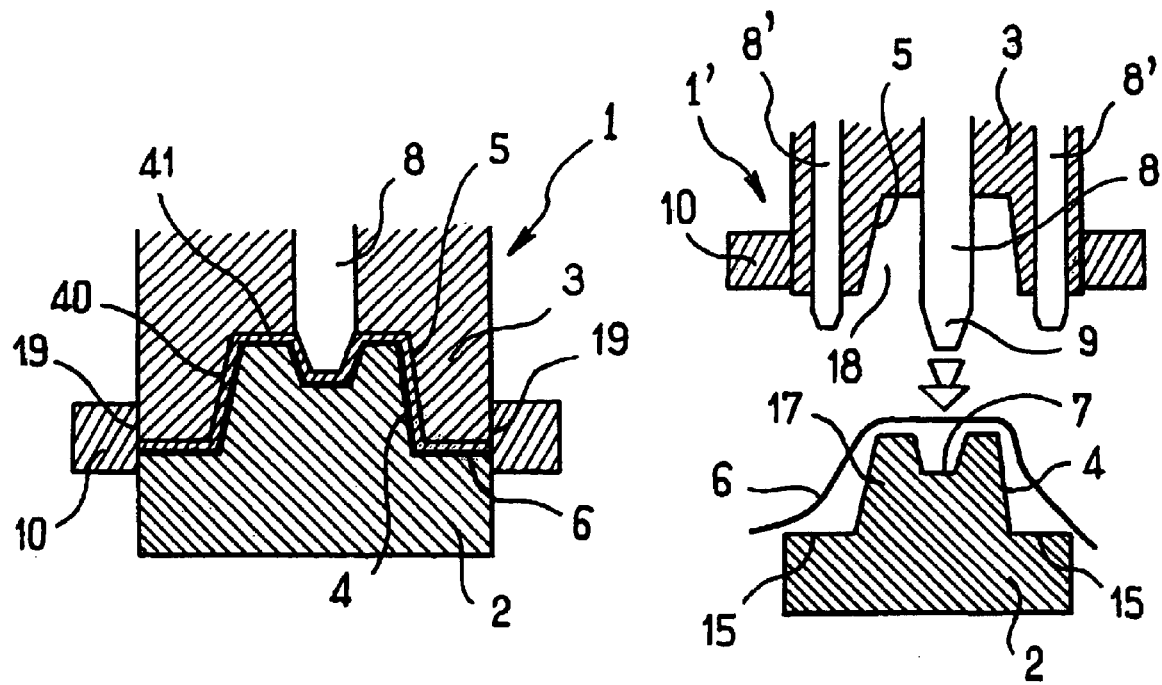
FIG_8   FIG_9

METHOD OF MANUFACTURING A PART OUT OF REINFORCED PLASTICS MATERIAL

The present invention relates to a method of manufacturing a reinforced plastics material part by using a drapable sheet and a mold.

The invention relates more particularly but not exclusively to manufacturing a structural part for a motor vehicle.

It is known to use drapable sheets constituted by woven fabric made of polypropylene and glass fiber yarn. An example is the material sold under the trade name TWIN-TEX by Vetrotex.

There exists a need to reduce cycle time in the manufacture of reinforced plastics material-parts so as to obtain higher rates of throughput.

The invention achieves this by a novel method of manufacturing a reinforced plastics material part from a sheet of drapable material by using a mold comprising first and second mold portions that are movable relative to each other, the method being characterized by the fact that it comprises the following steps:

placing the sheet on the first portion of the open mold;

pressing the sheet against the first portion at one or more locations by means of one or more pushers mounted on the second portion of the mold and movable relative to said second portion;

closing the mold and compacting the sheet; and unmolding the part.

By means of the invention, the drapable sheet is preformed on the mold cavity in a manner that is relatively simple and fast since the pushers used for this purpose are mounted directly on the second mold portion.

This avoids the need to use handling means external to the mold for preforming the sheet prior to the compacting step.

Advantageously, the sheet is preheated prior to being placed on the first mold portion.

The sheet is advantageously pressed against the first mold portion initially substantially in the center thereof so as to make the sheet easier to shape.

The sheet can thus be pressed against the first portion of the mold by means of one or more pushers situated substantially in the center of the mold, and then by means of other pushers, with the pushers that are furthest from the center of the mold being actuated last.

This makes it easier to cause the sheet to follow the outline of the mold cavity.

In addition, it reduces the risk of unwanted folds being formed.

Advantageously, the portion of the sheet which projects beyond the join plane after the mold has been closed is trimmed off.

This trimming can be performed as soon as the mold is closed, i.e. while the sheet is still hot, or after the sheet has been allowed to cool for a predetermined length of time.

Trimming is preferably performed by cutter means mounted on a cursor that is movable relative to the mold.

In a particular embodiment, the side wall of the cursor is arranged to co-operate with the mold so as to constitute a compression chamber enabling thermoplastic material to be overmolded onto the sheet.

The use of such a cursor makes it possible to trim the sheet and to form the compression chamber in a single operation, thereby further increasing production rates.

In a particular embodiment, the sheet is overmolded at least locally by extruding thermoplastic material prior to closing the mold.

In a variant, the sheet is overmolded by injecting thermoplastics material into the mold after it has been closed.

Still in a particular embodiment, the first portion of the mold has one or more grooves and the second portion of the mold has one or more ribs arranged to engage in said groove(s) so as to trim the sheets, at least in part, around the outline(s) of the groove(s) during closure of the mold.

With such a configuration it is possible to avoid using a cursor as defined above.

It is also possible to trim the part that is to be manufactured in part only, around a given outline, with said part remaining connected, after the mold has been opened, to the remainder of the sheet by mere bridges of material that can easily be broken or cut through.

In a particular implementation, the first mold portion constitutes a die having a setback in its top portion so that the resulting part is generally in the form of a channel section, the web of the channel having an indentation whose concave side faces in the opposite direction to the concave side of the channel.

This shape of die is particularly suited to making a motor vehicle bumper beam.

Advantageously, the second mold portion has one or more pushers arranged to engage in the above-mentioned setback.

The present invention also provides a mold for forming a sheet of reinforced plastics material, the mold comprising first and second portions that are movable relative to each other, and being characterized by the fact that it includes one or more pushers mounted on the second portion and movable relative thereto so as to press said sheet against the first portion at least locally, and at least one trimming means enabling the portion of the sheet that projects from the join plane to be trimmed off after the mold has been closed.

The first portion can include a setback and at least one of the pushers can advantageously present an end whose profile substantially matches the shape of the setback.

The pusher can thus contribute to compacting the sheet.

One of the two mold portions can include one or more grooves and the other mold portion can include one or more ribs arranged to engage in said groove(s) so as to trim the resulting part, in part.

The invention also provides a part made of reinforced plastics material obtained by implementing the method as defined above.

In order to make the invention better understood, there follows a description of implementations given as non-limiting examples and with reference to the accompanying drawings, in which:

FIGS. 1 to 4 are diagrams showing four successive steps in a first implementation of the invention;

FIG. 7 is a diagrammatic perspective view of a bumper beam obtained by the method shown in FIGS. 5 and 6;

FIG. 8 shows an example of overmolding the drapable sheet with thermoplastic material; and FIG. 9 is a diagram of a mold of the invention including a plurality of pushers.

Figure 5:
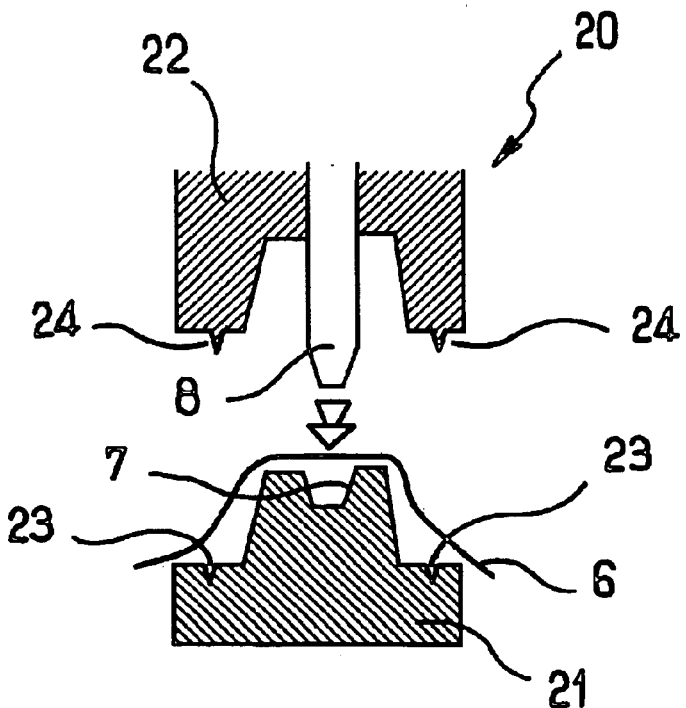
FIGS. 5 and 6 are diagrams showing the steps of a second implementation of the invention.

FIGS. 1 to 4 show a mold 1 of the invention in cross-section, the mold comprising a first or bottom portion 2 and a second or top portion 3 that are movable vertically relative to each other.

The facing faces 4 and 5 of the mold portions 2 and 3 are of shapes that are selected so as to confer the shape desired for the part that is to be manufactured to a drapable sheet 6 that is inserted between the mold portions prior to the mold being closed.

In the example described, the mold 1 used has a positive join plane 15, i.e. the drapable sheet 6 is clamped in the mold 1 with a force that depends on the pressure exerted by the top portion 3 against the bottom portion 2.

In the embodiment described, the top face 4 of the bottom portion 2 of the mold 1 is defined by a die 17 arranged to engage in a corresponding cavity 18 provided in the top mold portion 3.

On examining FIG. 1, it will be observed that the die 17 has no undercut surfaces, thereby making it easier to extract the part when the mold is reopened, and also ensuring that the sheet 6 is compressed between the two portions 2 and 3 of the mold at all points of its surface.

The section of the above-mentioned face 4 is suitable for imparting a generally channel section shape to the sheet with the concave side of the channel section being directed downwards, and the web of the channel section has a setback 7 with its concave side that is directed upwards.

A pusher 8 is mounted on the top portion 3 of the mold and is movable vertically relative thereto.

The pusher 8 has a bottom end 9 with substantially the same profile as the setback 7.

In the example described, the pusher 8 extends over the entire length of the setback 7.

A cursor 10 carrying trimmer means (not shown) is mounted on the outside of the top portion 3 of the mold 1.

The cursor 10 is connected to drive means (not shown) enabling it to be moved downwards relative to the top portion 3 so as to trim off the portion of the sheet 6 that projects from the join plane 15.

The various steps in manufacturing a reinforced plastics material part from the sheet 6 are described below.

At the beginning of the method, the mold 1 is in the open position, as shown in FIG. 1.

The preheated sheet 6 is placed on the bottom portion 2 of the mold 1 by means of a conventional handling and deposition tool which is not shown in order to clarify the drawing.

After the sheet 6 has been put into place, the pusher 8 is lowered so that its bottom end 9 presses the sheet 6 against the setback 7 in the bottom portion 2, as shown in FIG. 2.

The sheet 6 thus begins to be shaped in the mold 1.

Thereafter, the top portion 3 of the mold 1 is a lowered so as to press the entire sheet 6 against the bottom portion 2, and in particular press down the portions 12 of the sheet that overlie the flanks of the die 17.

FIG. 3 shows the mold 1 when closed.

It can be seen that while the top portion 3 of the mold 1 was being lowered, the pusher 8 was kept engaged in the setback 7.

Thereafter the cursor 10 is lowered so as to trim off the peripheral portion 16 of the sheet 6 where it projects from the join plane 15, as shown in FIG. 4.

The sheet 6 is then compacted by pressing together the top and bottom portions 2 and 3 of the mold 1, while exerting a given amount of pressure on the top portion 2 and the pusher 8.

From the above description, it will be understood that the various operations can be performed quickly one after another as soon as the sheet 6 has been put into place in the mold 1.

This makes it possible to obtain high rates of production throughput.

Figure 6:
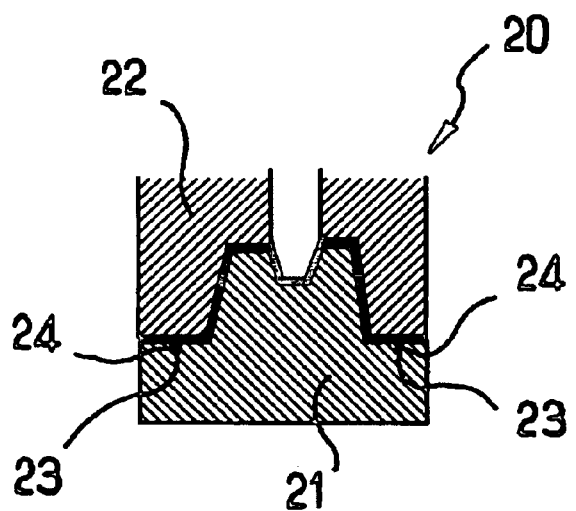

FIGS. 5 and 6 show a second implementation of the invention.

In this implementation, the mold 20, which is shown in cross-section, comprises a bottom portion 21 and a top portion 22.

The general shape of the mold cavity 20 is analogous to that of the mold 1 in the preceding example.

The bottom portion 21 of the mold 20 differs from the bottom portion 2 by the fact that it includes grooves 23 disposed substantially to follow the outline of the part that is to be made.

The top portion 22 of the mold differs from the portion 1 by the fact that it includes ribs 24 suitable for engaging in the grooves 22 when the mold 20 is closed.

In this implementation, the drapable sheet 6 is pressed against the bottom portion 21 of the mold 20 by means of the pusher 8 mounted on the top portion 22 of the mold and movable relative thereto, in the same manner as in the preceding example.

Thereafter, the mold 20 is closed, which leads to the configuration shown in FIG. 6.

The ribs 24 trim the sheet 6 around a predetermined outline by engaging in the grooves 23.

FIG. 7 is a diagrammatic perspective view of a part 30 obtained with the above-described mold 20.

In the example described, the part 20 constitutes a bumper beam for a motor vehicle.

It constitutes a generally channel section member, with the web of the channel having an indentation 31 whose concave side faces away from the concave side of the main channel section.

This indentation 31 corresponds to the setback 7.

It can be seen that the ribs 24 and the grooves 23 have served to pre-trim the part by leaving cutouts 32.

The part 30 has a surround 33 which is connected thereto only by means of bridges of material 34 extending between the cutouts 32 and easy to cut through.

The cursor 10 can be used to co-operate with the top and bottom portions 3 and 2 of the mold to form a compression chamber 40, as described below with reference to FIG. 8.

More precisely, a gap is left between the top and bottom portions 3 and 2 of the mold over the sheet 6 and the inside surface 19 of the cursor 10 is placed over said gap so as to close it.

A channel for injecting thermoplastics material under pressure (not shown) serves to inject a certain quantity 41 of thermoplastics material into the mold in contact with the sheet 6, in the above-mentioned gap, thereby forming stiffening ribs, for example.

In a variant, the mold does not have an injection channel, and the thermoplastic material is deposited in the mold by extrusion before the mold is closed.

In which case, it is the clamping between the two mold portions that serves to spread the material within the mold.

In the implementations described above, the drapable sheet 6 is constituted by a sheet of TWINTEX.

Naturally, it would not go beyond the ambit of the invention to use other materials in sheet form that are capable of leading to the same result or to a similar result.

The implementations described above are not limiting in any way.

In particular, it is possible to mount other pushers on the mold.

By way of example, FIG. 9 shows a mold 1' that differs from the mold 1 by the fact that it includes additional peripheral pushers 8' disposed on either side of the central pusher 8.

To enable the sheet 6 to be formed partially, the central pusher 8 is lowered initially, after which the peripheral pushers 8' are lowered.

As described above, the use of a plurality of pushers is particularly advantageous when the part to be made is of complex shape.

What is claimed is:

1. A method of manufacturing a reinforced plastics material part from a sheet of drapable material by using a mold comprising first and second mold portions that are movable relative to each other, the method comprising:

placing the sheet on the first portion of the open mold, said first portion comprising a die having a top portion, said top portion having a setback;

pressing the sheet against the first portion at at least one location without substantially stretching the sheet using at least one pusher mounted on the second portion of the mold and movable relative to said second portion, wherein at least one of the pushers having an end profile that corresponds substantially to the shape of the setback;

closing the mold, a portion of the sheet projecting from the join plane after the mold has closed;

compacting the sheet;

trimming off a portion of the sheet projecting from the join plane after the mold has closed; and unmolding the part.

2. A method according to claim 1, wherein the sheet is pressed against the first portion of the mold initially substantially in the center thereof.

3. A method according to claim 2, wherein the at least one pusher comprises a plurality of pushers and wherein the sheet is pressed against the first portion of the mold initially using at least one pusher situated substantially in the center of the mold, and then progressively by other pushers, pushers furthest from the center of the mold being actuated last.

4. A method according to claim 1, wherein trimming is performed by blades mounted on a cursor.

5. A method according to claim 4, wherein the cursor has an inside wall configured so as to cooperate with the mold to form a compression chamber, and wherein thermoplastics material is overmolded on the sheet inside said compression chamber.

6. A method according to claim 5, wherein the thermoplastic material is deposited by being extruded on the sheet before the mold is closed.

7. A method according to claim 5, wherein the sheet is overmolded by injecting thermoplastics material into the mold after the mold has been closed.

8. A method according to claim 1, wherein the first mold portion has at least one groove and the second mold portion has at least one rib arranged to engage in said at least one groove, so as to trim the sheet at least in part around the outline of the at least one groove when the mold is closed.

9. A method according to claim 1, wherein the first portion constitutes a die having a setback in its top portion such that the resulting part is of generally channel section, with the web of the channel section having an indentation whose concave side faces in the opposite direction to the concave side of the channel section.

10. A method according to claim 9, wherein the second mold portion has at least one pusher arranged to engage in the setback of the first portion.

11. A method according to claim 1, wherein the reinforced plastics material part is a structural part of a motor vehicle.

12. A method according to claim 1, wherein the sheet comprises a thermoplastic material.

13. A method according to claim 12, wherein the sheet comprises polypropylene.

14. A mold for forming a sheet of reinforced plastics material, the mold comprising:

first and second portions that are movable relative to each other, said first portion comprising a die having a top portion, said top portion having a setback;

at least one pusher mounted an the second portion and movable relative thereto so as to press said sheet at least locally against the first portion before the mold is closed, wherein at least one of the pushers having an end of profile that corresponds substantially to the shape of the setback; and at least one trimmer enabling the portion of the sheet that projects from the join plane to be trimmed off once the mold is closed.

15. A mold according to claim 14, wherein one of the two mold portions has at least one groove and the other portion has at least one rib arranged to engage in said at least one groove so as to perform partial trimming of the part that is produced.

16. A method of manufacturing a reinforced plastics material part from a sheet of drapable material by using a mold comprising first and second mold portions that are movable relative to each other, said first portion comprising a die having a top portion, said top portion having a setback, the method comprising:

preheating the sheet;

placing the preheated sheet on the first portion of the open mold;

pressing the sheet against the first portion at at least one location using at least one pusher mounted on the second portion of the mold and movable relative to said second portion, at least one of the pushers having an end of profile that corresponds substantially to the shape of the setback;

closing the mold and compacting the sheet; and unmolding the part.

17. A method according to claim 16, wherein the sheet is pressed against the first portion of the mold initially substantially in the center thereof.

18. A method according to claim 17, wherein the at least one pusher comprises a plurality of pushers and wherein the sheet is pressed against the first portion of the mold initially using at least one pusher situated substantially in the center of the mold, and then progressively using other pushers, a pusher furthest from the center of the mold being actuated last.

19. A method according to claim 16 comprising:

trimming off a portion of the sheet projecting from the join plane.

20. A method according to claim 19, wherein trimming is performed by blades mounted on a cursor.

21. A method according to claim 20, wherein the cursor has an inside wall configured so as to cooperate with the mold to form a compression chamber, and wherein a thermoplastic material is overmolded on the sheet inside said compression chamber.

22. A method according to claim 21, wherein the thermoplastic material is deposited by being extruded on the sheet before the mold is closed.

23. A method according to claim 21, wherein the sheet is overmolded by injecting the thermoplastic material into the mold after the mold has been closed.

24. A method according to claim 16, wherein the sheet comprises a thermoplastic material.

25. A method according to claim 24, wherein the sheet comprises polypropylene.

26. A method according to claim 16, wherein the first portion constitutes a die having a setback in its top portion such that a resulting part is of generally channel section, with a web of the channel section having an indentation whose concave side faces in the opposite direction to a concave side of the channel section.

27. A method according to claim 26, wherein the second mold portion has at least one pusher arranged to engage in the setback of the first portion.

28. A method of manufacturing a reinforced plastics material part from a sheet of drapable material by using a mold comprising first and second mold portions that are movable relative to each other, the method comprising:

preheating the sheet;

placing the preheated sheet on the first portion of the open mold, said first portion comprising a die having a top portion, said top portion having a setback;

pressing the sheet against the first portion at at least one location using at least one pusher mounted on the second portion of the mold and movable relative to said second portion, wherein at least one of the pushers having an end profile that corresponds substantially to the shape of the setback;

closing the mold, a portion of the sheet projecting from the join plane after the mold has closed;

compacting the sheet;

trimming of the portion of the sheet that projects from the join plane using a trimmer that is movable relative to said second mold portion; and unmolding the part.

29. An apparatus for manufacturing a reinforced plastics material part from a sheet of drapable material by using a mold comprising first and second mold portions that are movable relative to each other, said first portion comprising a die having a top portion, said top portion having a setback, the method comprising:

means for placing the sheet on the first portion of the open mold;

means for pressing the sheet against the first portion at at least one location using at least one pusher mounted on the second portion of the mold and movable relative to said second portion, at least one of the pushers having an end of profile that corresponds substantially to the shape of the setback;

means for closing the mold, a portion of the sheet projecting from the join plane after the mold has closed;

means for compacting the sheet;

means for trimming off the portion of the sheet that projects from the join plane; and means for unmolding the part.

30. A method of manufacturing a reinforced plastics material part from a sheet of drapable material by using a mold comprising first and second mold portions that are movable relative to each other and a plurality of pushers movably mounted on the second mold portion, the method comprising:

placing the sheet an the first portion of the open mold, said first portion comprising a die having a tap portion, said top portion having a setback;

pressing the sheet against the first portion of the mold initially using at least one pusher situated substantially in the center of the mold without substantially stretching the sheet, and then progressively using other pushers, a pusher furthest from the center of the mold being actuated last, wherein at least one of the pushers having an end profile that corresponds substantially to the shape of the setback;

closing the mold;

compacting the sheet; and unmolding the part.

31. A method according to claim 30 comprising:

trimming off a portion of the sheet projecting from the join plane of the mold.

32. A method of manufacturing a reinforced plastics material part from a sheet of drapable material by using a mold comprising first and second mold portions that are movable relative to each other, the method comprising:

placing the sheet on the first portion of the open mold;

pressing the sheet against the first portion at at least one location using at least one pusher mounted on the second portion of the mold and movable relative to said second portion;

closing the mold;

pre-trimming the sheet using at least one rib on one of said first and second portions, said rib engaging in at least one groove of the other of said first and second portions, in such a manner that a first portion of the sheet is connected to a second portion of the sheet by a bridge of material extending between cut-outs;

compacting the sheet; and unmolding the part.

33. A method according to claim 32, wherein the first mold portion has at least one groove and the second mold portion has at least one rib arranged to engage in said at least one groove, so as to trim the sheet at least in part around the outline of the at least one groove when the mold is closed.

* * * * *